US012797874B2

(12) United States Patent
Wu et al.

(10) Patent No.: US 12,797,874 B2
(45) Date of Patent: Nov. 17, 2026

(54) SAND-PROOF SPRINKLER MECHANISM

(71) Applicant: ZhongShan QingYi Metal Products Enterprise CO., LTD, ZhongShan City (CN)

(72) Inventors: Kun Guang Wu, ZhongShan City (CN); Huanzhao Liang, ZhongShan City (CN); Shulong Li, ZhongShan City (CN); Tang Chieh Yu, Taichung City (TW)

(73) Assignee: ZHONGSHAN QINGYI METAL PRODUCTS ENTERPRISE CO., LTD, Zhongshan City (CN)

( * ) Notice: Subject to any disclaimer, the term of this patent is extended or adjusted under 35 U.S.C. 154(b) by 175 days.

(21) Appl. No.: 18/782,778

(22) Filed: Jul. 24, 2024

(65) Prior Publication Data

US 2025/0033067 A1 Jan. 30, 2025

(30) Foreign Application Priority Data

Jul. 28, 2023 (CN) ......................... 202310944422.3

(51) Int. Cl.
*B05B 3/04* (2006.01)
*F04D 29/22* (2006.01)

(52) U.S. Cl.
CPC ........ *B05B 3/0432* (2025.08); *F04D 29/2222* (2013.01)

(58) Field of Classification Search
CPC .......................... B05B 3/0432; F04D 29/2222
USPC .......................................................... 239/242
See application file for complete search history.

(56) References Cited

U.S. PATENT DOCUMENTS

| | | | | | |
|---|---|---|---|---|---|
| 2,942,789 | A * | 6/1960 | Smith | B05B 3/0438 | 239/242 |
| 3,117,724 | A * | 1/1964 | Ray | B05B 15/74 | 239/394 |
| 3,934,820 | A * | 1/1976 | Phaup | B05B 15/74 | 239/206 |
| 4,568,024 | A * | 2/1986 | Hunter | B05B 3/0432 | 239/242 |
| 4,625,914 | A * | 12/1986 | Sexton | B05B 1/0856 | 239/206 |
| 5,033,678 | A * | 7/1991 | Borghese | B05B 3/0438 | 239/242 |
| 7,086,609 | B2 * | 8/2006 | Wang | B05B 3/0435 | 239/242 |

(Continued)

FOREIGN PATENT DOCUMENTS

CN 103752434 A 4/2014

*Primary Examiner* — Chee-Chong Lee
(74) *Attorney, Agent, or Firm* — MUNCY, GEISSLER, OLDS & LOWE, P.C.

(57) ABSTRACT

A sand-proof sprinkler mechanism has a base. A housing and a connecting platform are provided on the base. A hose is rotatably connected between the housing and the connecting platform. The housing has a water outlet, a housing inner chamber and a water inlet that are in communication with the hose. The housing includes an impeller transmission member and a transmission device that is drivingly connected to the impeller transmission member and the hose. The housing further has a sealing chamber for mounting the transmission device. A water baffle is provided at an opening of the sealing chamber for covering the sealing chamber. The above structure prevents particles from entering and getting stuck.

10 Claims, 7 Drawing Sheets

(56) References Cited

U.S. PATENT DOCUMENTS

| | | | | |
|---|---|---|---|---|
| 7,226,000 | B2 * | 6/2007 | Huang | B05B 3/0438<br>74/577 M |
| 7,942,347 | B2 * | 5/2011 | Huang | B05B 3/0438<br>239/582.1 |
| 2006/0102751 | A1 * | 5/2006 | Heren | B05B 1/202<br>239/452 |
| 2006/0157583 | A1 * | 7/2006 | Huang | B05B 3/0438<br>239/242 |
| 2011/0079662 | A1 * | 4/2011 | Wang | B05B 3/0435<br>239/240 |

* cited by examiner

SAND-PROOF SPRINKLER MECHANISM

FIELD OF THE INVENTION

The present invention relates to a sprinkler mechanism, and more particularly, to a sand-proof sprinkler mechanism.

BACKGROUND OF THE INVENTION

A sprinkler mechanism is a kind of device installed on the garden, plaza or lawn for watering plants.

China Patent Publication No. CN 103752434 discloses a sprinkler mechanism. In daily use, the water source usually contains sand, the sand easily gets stuck on the transmission structure and damage the equipment. Therefore, there is a need for a sprinkler mechanism that can prevent sand from getting stuck on the transmission structure.

SUMMARY OF THE INVENTION

In view of the deficiencies of the prior art, the primary object of the present invention is to provide a sand-proof sprinkler mechanism. The sprinkler mechanism is able to prevent sand from getting stuck on a transmission device of the sprinkler mechanism.

In order to achieve the foregoing object, the sand-proof sprinkler mechanism provided by the present invention comprises a base, a housing, and a connecting platform. The housing and the connecting platform are disposed on the base. A hose is rotatably connected between the housing and the connecting platform. The housing has a water outlet, a housing inner chamber and a water inlet that are in communication with the hose. The housing includes an impeller transmission member and a transmission device that is drivingly connected to the impeller transmission member and the hose. The housing further includes an adjustment device for adjusting a direction of a water flow, so that the impeller transmission member is driven by the water flow to rotate clockwise and counterclockwise to drive the hose to rotate back and forth. The housing further has a sealing chamber for mounting the transmission device. A water baffle is provided at an opening of the sealing chamber for covering the sealing chamber. The water baffle has a connecting through hole for the transmission device to be connected to an output end of the impeller transmission member.

Preferably, the transmission device includes a gear element that is drivingly connected to the impeller transmission member and a hose connector that is drivingly connected to the gear element and detachably connected to the hose. The water outlet is disposed on the hose connector.

Preferably, the hose has a locking groove, and the hose connector has a locking buckle to be locked in the locking groove.

Preferably, an impeller cover is provided on one side of the impeller transmission member close to the water inlet. The impeller cover has a first through hole and a second through hole. The adjustment device includes a conversion wheel rotatably connected to the impeller cover and an angle adjustment unit connected to the conversion wheel in a snap-fit manner. The conversion wheel includes a blocking piece thereon. The conversion wheel has a first rotation position and a second rotation position. When the conversion wheel rotates to the first rotation position, the blocking piece covers the second through hole. When the conversion wheel rotates to the second rotation position, the blocking piece covers the first through hole.

Preferably, the angle adjustment unit includes an angle adjustment assembly that is rotatably connected outside the housing and a switching lever that is drivingly connected to the angle adjustment assembly. The conversion wheel has an engaging portion. The switching lever has an engaging groove for insertion of the engaging portion and an engaging plane for engagement of the engaging portion. The impeller cover has a restricting protrusion. When the conversion wheel rotates to the first rotation position, the engaging portion is inserted into the engaging groove. When the conversion wheel rotates to the second rotation position, the engaging portion leans against the engaging plane and the switching lever leans against the restricting protrusion. The angle adjustment assembly has a matching through hole. The hose connector has a protruding rib inserted into the matching through hole. When the hose connector is rotated, the protruding rib leans against an inner wall of the matching through hole to rotate the angle adjustment assembly, thereby rotating the switching lever.

Preferably, the angle adjustment assembly includes an angle adjuster, an angle control sleeve, and a travel switching lever. The angle adjuster has a mounting through hole. A connecting block having a wavy surface is provided on an inner wall of the mounting through hole. The angle control sleeve includes an outer toothed ring that is inserted into the mounting through hole and meshed with the connecting block. The angle control sleeve includes a travel block. The travel block has a travel through hole. The stroke switching lever includes a stroke rod inserted into the stroke through hole and a switching through hole into which one end of the switching lever is inserted.

Preferably, that the impeller cover has an impeller cam. The impeller cam has an impeller groove. The impeller transmission member is partially disposed in the impeller groove. The first through hole and the second through hole are defined in the impeller groove.

DETAILED DESCRIPTION OF THE PREFERRED EMBODIMENTS

Figure 1:
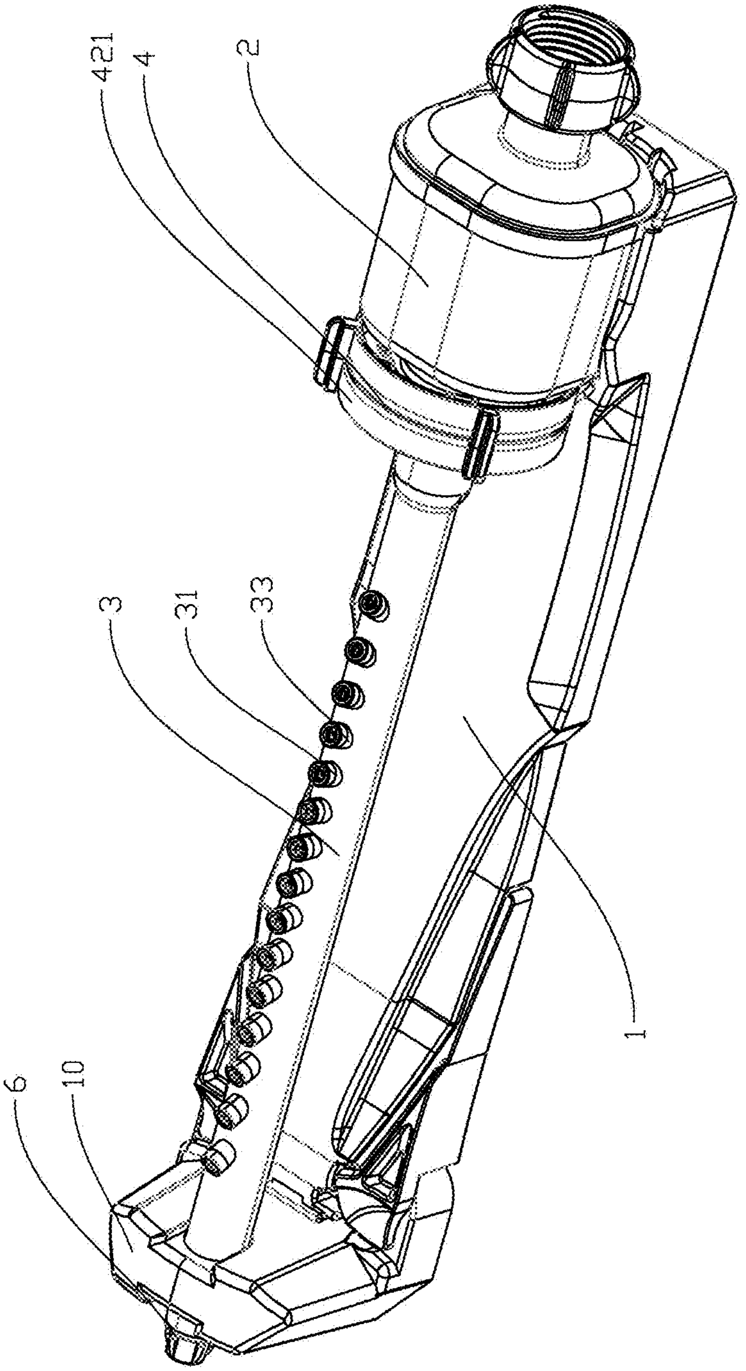
FIG. 1 is a perspective view of the present invention.

As shown in FIG. 1 through FIG. 13, the present invention discloses a sand-proof sprinkler mechanism, comprising a base 1, a housing 2 and a connecting platform 10. The housing 2 and the connecting platform 10 are disposed on the base 1. A hose 3 is rotatably connected between the housing 2 and the connecting platform 10. The housing 2 has a water outlet 21, a housing inner chamber 22 and a water inlet 23 that are in communication with the hose 3. The housing 2 includes an impeller transmission member 24 and a transmission device 25 that is drivingly connected to the impeller transmission member 24 and the hose 3. The housing 2 further includes an adjustment device 4 for adjusting the direction of the water flow, so that the impeller transmission member 24 is driven by the water flow to rotate clockwise and counterclockwise to drive the hose 3 to rotate back and forth. The housing 2 further has a scaling chamber 221 for mounting the transmission device 25. A water baffle 261 is provided at the opening of the sealing chamber 221 for covering the sealing chamber 221. The water baffle 261 has a connecting through hole 2611 for the transmission device 25 to be connected to an output end of the impeller transmission member 24. When water is injected from the water inlet 23, the water pressure of the water flow will drive the impeller transmission member 24 to rotate, thereby allowing the hose 3 to swing and sprinkle water. The adjustment device 4 adjusts the direction of the water flow for impeller transmission member 24 to rotate clockwise and counterclockwise, thereby driving the transmission device 25 to drive the hose 3 to swing back and forth to sprinkle water. Since small hard particles such as sand and gravel often appear in the water source, these hard particles will easily get stuck on the surface of the transmission device 25 when in use, resulting in jamming, wear and tear, and reducing the service life of the product. The water baffle 261 blocks most of the water, so that the remaining part of the water enters the sealing chamber 221 to lubricate the transmission device 25, and prevent hard particles from entering and jamming the transmission device 25. Since the impeller transmission member 24 needs to be drivingly connected with the transmission device 25, the connecting through hole 2611 is configured for the transmission device 25 to be connected to the output end of the impeller transmission member 24.

Referring to FIG. 1 through FIG. 6, the transmission device 25 includes a gear element 251 that is drivingly connected to the impeller transmission member 24 and a hose connector 252 that is drivingly connected to the gear element 251 and detachably connected to the hose 3. The water outlet 21 is disposed on the hose connector 252. The gear element 251 is mounted in the sealing chamber 221. The output end of the gear element 251 extends out of the housing 2. The hose connector 252 is disposed outside the housing 2 and connected to the hose 3 and meshed with the output end of the gear element 251. The water outlet 21 is disposed on the hose connector 252 so that the transmission part of the hose connector 252 and the entire gear element 251 can isolate the water source, and the water outlet 21 communicates with the housing inner chamber 22 and the hose 3. The hose connector 252 has the dual functions of delivering water and swinging back and forth. The water outlet 21 is in the middle, having a simple structure. The gear element 251 plays the role of speed change. The housing 2 has a partition 26 to divide the housing inner chamber 22 into a water chamber 222 and a sealing chamber 221. The water flow passes through the water inlet 23, the water chamber 222, the water outlet 21 and the hose 3 in sequence.

Figure 2:
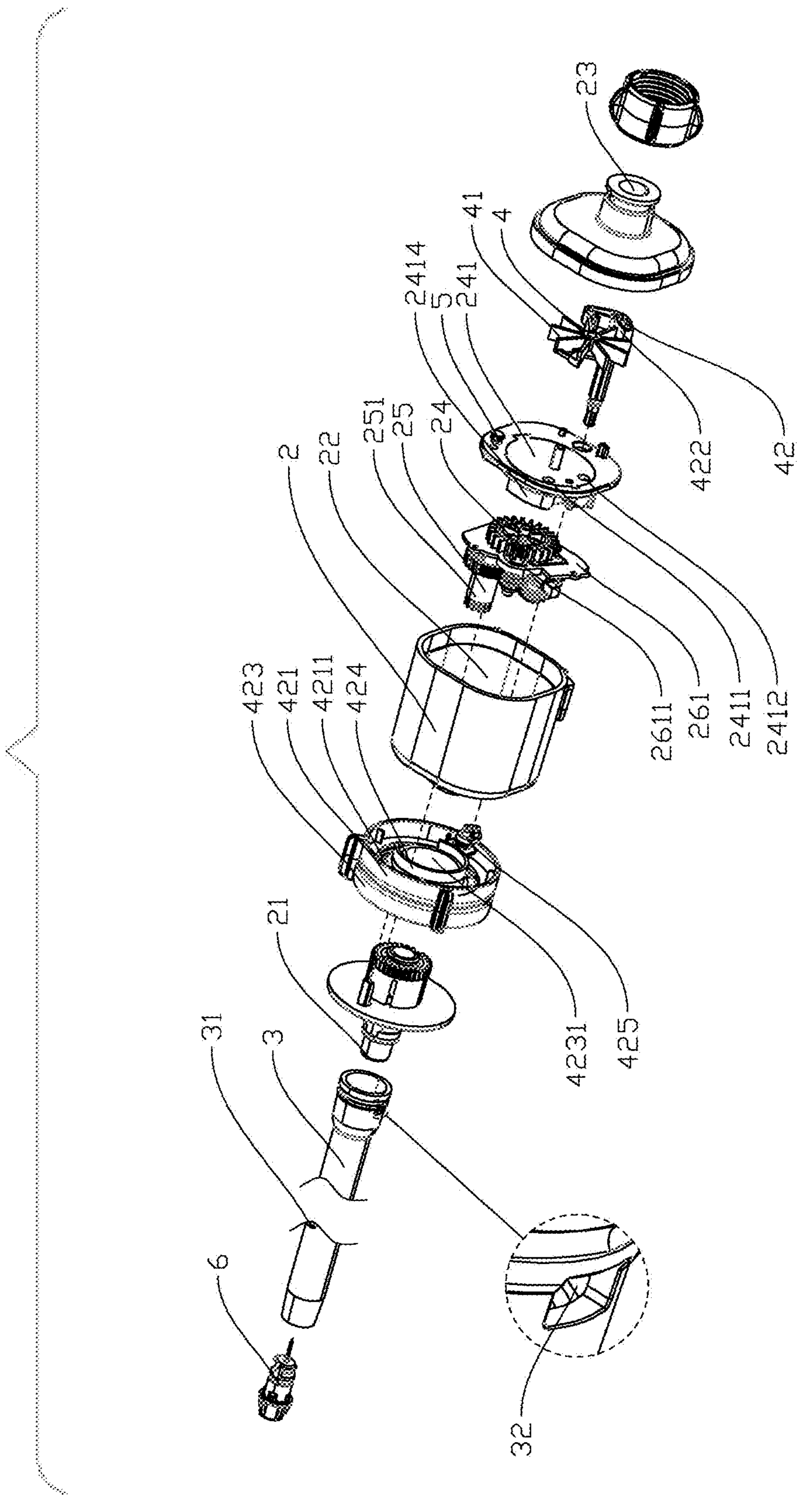
FIG. 2 is an exploded view of the present invention.
Figure 3:
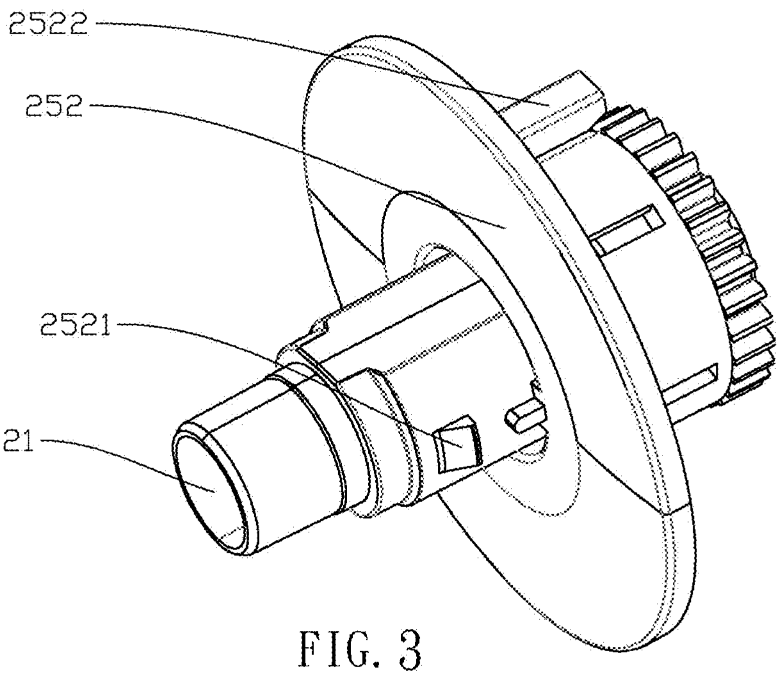
FIG. 3 is a perspective view of the hose connector of the present invention.
Figure 4:
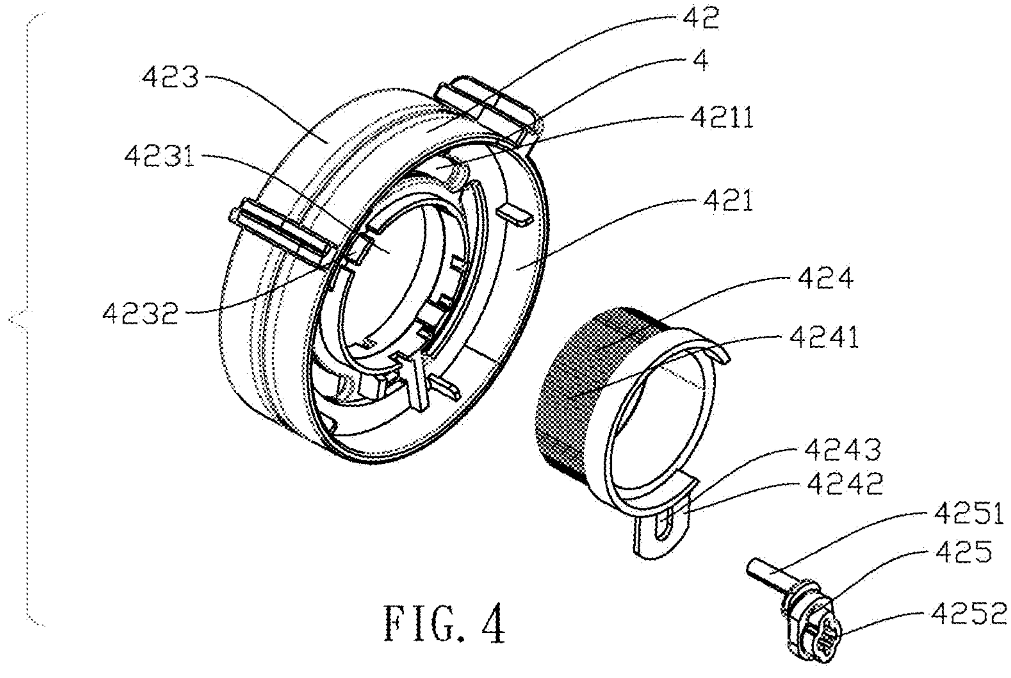
FIG. 4 is a perspective view of the angle adjuster of the present invention.
Figure 5:
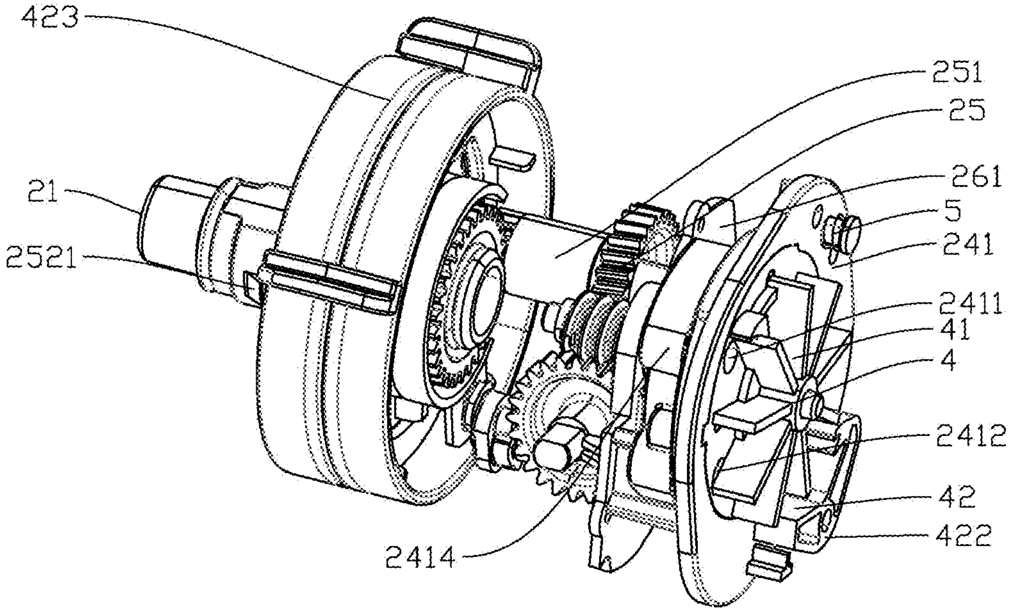
FIG. 5 is a perspective view of the impeller transmission member, the transmission device and the angle adjustment device of the present invention.

Referring to FIG. 2 and FIG. 3, the hose 3 has a locking groove 32, and the hose connector 252 has a locking buckle 2521 to be locked in the locking groove 32. In general, the hose 3 is large in structure. If the hose 3 is connected using a conventional threaded structure, the connection will be very troublesome. If the hose 3 is connected in a snap-fit manner, the connection will be convenient and quick. As shown in FIG. 2, the diameter of the inlet of the hose 3 is gradually reduced. As shown in FIG. 3, the left side of the hose connector 252 has a connecting cylinder for connecting the hose 3. The outer diameter of the connecting cylinder is less than the inner diameter of the locking buckle 2521, which allows for a tight fit of the hose 3 and the hose connector 252 to avoid water seepage.

Referring to FIG. 5, FIG. 7, FIG. 12 and FIG. 13, an impeller cover 241 is provided on one side of the impeller transmission member 24 close to the water inlet 23. The impeller cover 241 has a first through hole 2411 and a second through hole 2412. The adjustment device 4 includes a conversion wheel 41 rotatably connected to the impeller cover 241 and an angle adjustment unit 42 connected to the conversion wheel 41 in a snap-fit manner. The conversion wheel 41 includes a blocking piece 411. The conversion wheel 41 has a first rotation position and a second rotation position. When the conversion wheel 41 rotates to the first rotation position, the blocking piece 411 covers the second through hole 2412. When the conversion wheel 41 rotates to the second rotation position, the blocking piece 411 covers the first through hole 2411. The water pressure of the water flow supplies power to the conversion wheel 41 to rotate. The angle adjustment unit 42 may be connected to the conversion wheel 41 in at different positions, thereby enabling the conversion wheel 41 to switch back and forth between the first rotation position and the second rotation position. When the water flow passes through the first through hole 2411 and the second through hole 2412, the impeller transmission member 24 will be driven to rotate in different directions.

Referring to FIG. 5, FIG. 7, FIG. 12 and FIG. 13, the angle adjustment unit 42 includes an angle adjustment assembly 421 that is rotatably connected outside the housing 2 and a switching lever 422 that is drivingly connected to the angle adjustment assembly 421. The conversion wheel 41 has an engaging portion 412. The switching lever 422 has an engaging groove 4221 for insertion of the engaging portion 412 and an engaging plane 4222 for engagement of the engaging portion 412. The impeller cover 241 has a restricting protrusion 2413. When the conversion wheel 41 rotates to the first rotation position, the engaging portion 412 is inserted into the engaging groove 4221. When the conversion wheel 41 rotates to the second rotation position, the engaging portion 412 leans against the engaging plane 4222 and the switching lever 422 leans against the restricting protrusion 2413.

Referring to FIG. 1 through FIG. 6, the angle adjustment assembly 421 has a matching through hole 4211. The hose connector 252 has a protruding rib 2522 inserted into the matching through hole 4211. When the hose connector 252 is rotated, the protruding rib 2522 leans against the inner wall of the matching through hole 4211 to rotate the angle adjustment assembly 421, thereby rotating the switching lever 422.

Referring to FIG. 1 through FIG. 6, the angle adjustment assembly 421 includes an angle adjuster 423, an angle control sleeve 424, and a travel switching lever 425. The angle adjuster 423 has a mounting through hole 4231. A connecting block 4232 having a wavy surface is provided on the inner wall of the mounting through hole 4231. The angle control sleeve 424 includes an outer toothed ring 4241 that is inserted into the mounting through hole 4231 and meshed with the connecting block 4232. The angle control sleeve 424 includes a travel block 4242. The travel block 4242 has a travel through hole 4243. The stroke switching lever 425 includes a stroke rod 4251 inserted into the stroke through hole 4243 and a switching through hole 4252 into which one end of the switching lever 422 is inserted.

Figure 6:
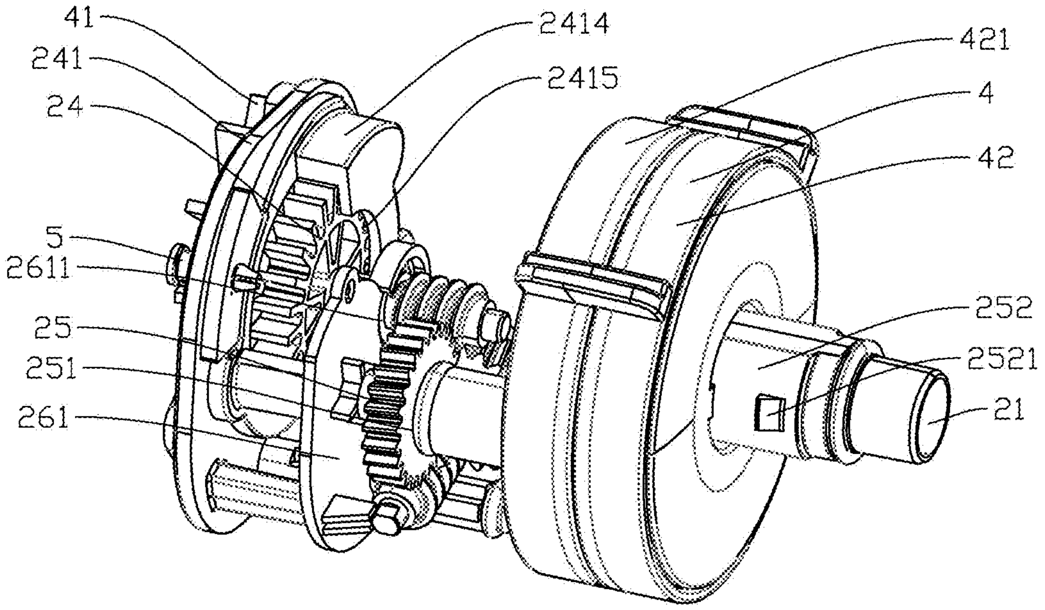
FIG. 6 is another perspective view of the impeller transmission member, the transmission device and the angle adjustment device of the present invention.
Figure 7:
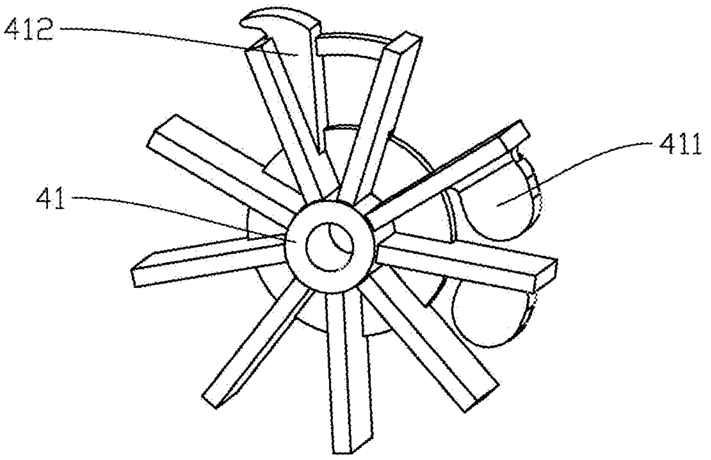
FIG. 7 is a perspective view of the conversion wheel of the present invention.
Figure 8:
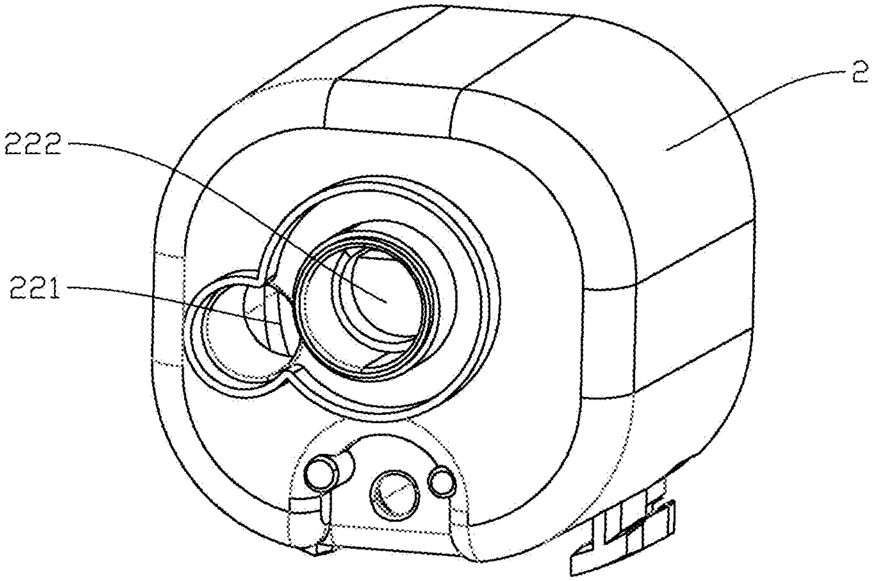
FIG. 8 is a perspective view of part of the housing of the present invention.
Figure 9:
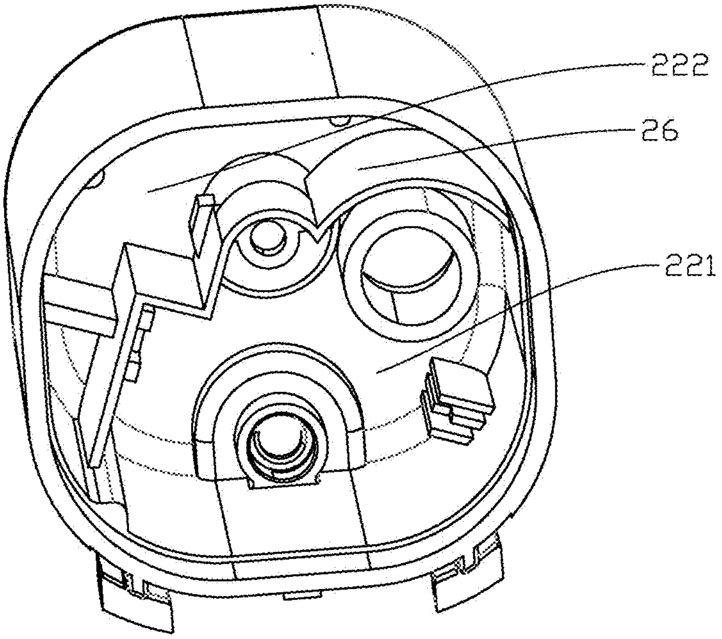
FIG. 9 is another perspective view of part of the housing of the present invention.

Referring to FIG. 6, the impeller cover 241 has an impeller cam 2414. The impeller cam 2414 has an impeller groove 2415. The impeller transmission member 24 is partially disposed in the impeller groove 2415. The first through hole 2411 and the second through hole 2412 are defined in the impeller groove 2415. The inner wall of the impeller groove 2415 has a slope. When the water flows out from the first through hole 2411 or the second through hole 2412, it will flow in different directions, thereby driving the impeller transmission member 24 to rotate in different directions.

Figure 10:
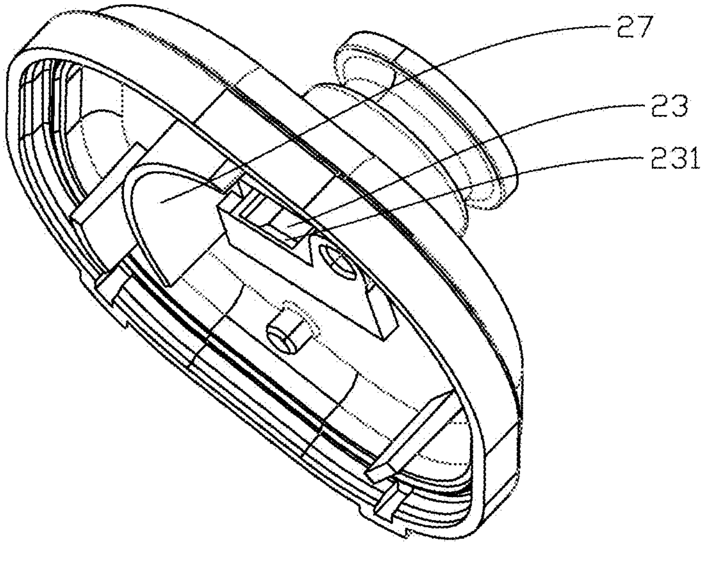
FIG. 10 is a perspective view of another part of the housing of the present invention.
Figure 11:
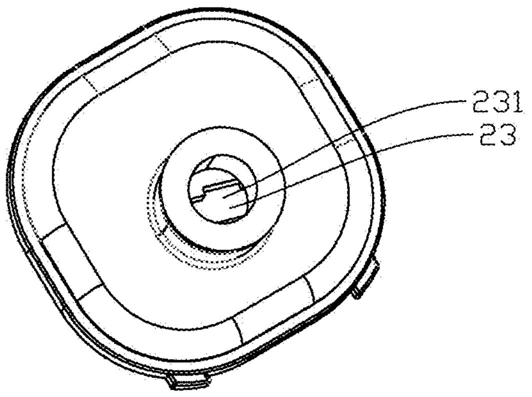
FIG. 11 is another perspective view of another part of the housing of the present invention.
Figure 12:
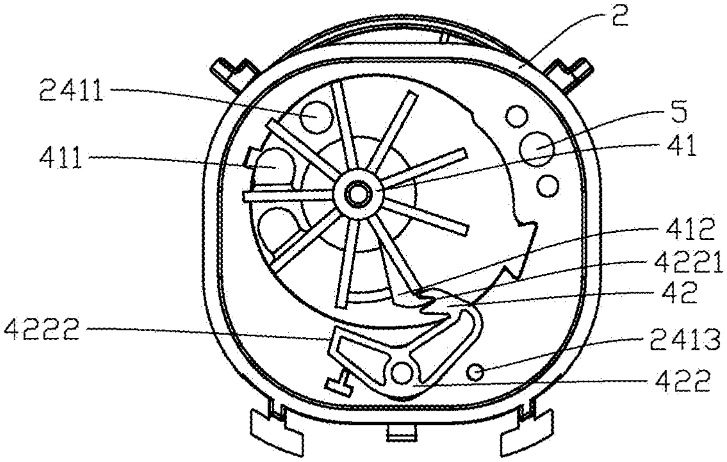
FIG. 12 is a schematic view of the present invention, wherein the conversion wheel is located at the first rotation position.
Figure 13:
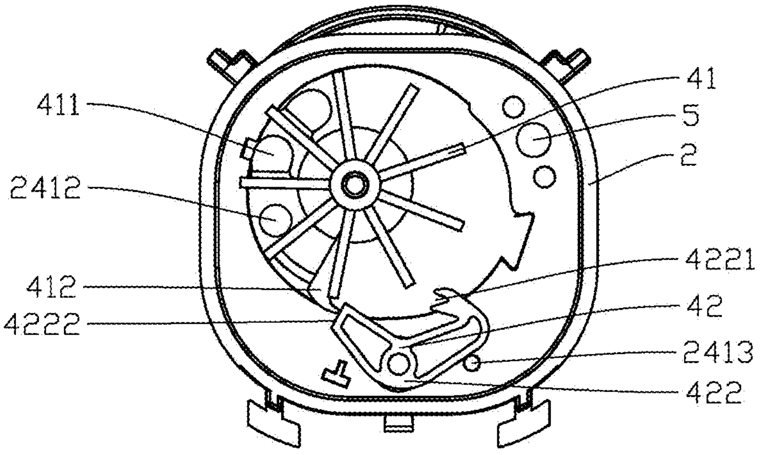
FIG. 13 is a schematic view of the present invention, wherein the conversion wheel is located at the second rotation position.

Referring to FIG. 10 and FIG. 11, the housing 2 has a guide slope 231 and a guide baffle 27 at the water inlet 23 so that the water flow drives the conversion wheel 41 to rotate counterclockwise.

Referring to FIG. 5, FIG. 6, FIG. 12 and FIG. 13, a pressure-reducing valve 5 is provided on the upper portion of the impeller cover 241. The pressure-reducing valve 5 is configured for diverting the water flow and reducing the impact of the water flow, thereby ensuring that the transmission device 25 will not rotate too fast.

Referring to FIG. 1 and FIG. 2, the hose 3 has at least two spray nozzles 31 and at least two bosses 33 with different inclination directions. The bosses 33 each have a hose hole communicating with the interior of the hose 3 and configured for insertion of the nozzles 31. A hole cleaner 6 is insertedly connected to one end of the hose 3. The bosses 33 are inclined in different directions for a larger and more even spraying area. The hole cleaner 6 is configured to avoid clogging of the hose 3.

The process of water flow: Water comes in from the water inlet 23, flows through the water chamber 222, the water outlet 21 and the hose 3, and finally sprays out from the spray nozzles 31.

The process of rotation: Water comes in from the water inlet 23, flows into the first through hole 2411 or the second through hole 2412 to push the impeller transmission member 24 to rotate along the inner wall of the impeller groove 2415, which in turn drives the gear element 251 and the hose connector 252 to rotate. Since the hose connector 252 is connected on the hose 3, the hose 3 is also driven to rotate.

The process of reciprocal rotation: As the guide slope 231 and the guide baffle 27 are disposed at the water inlet 23, the water flow will continuously push the conversion wheel 41 to rotate counterclockwise. When the switching lever 422 rotates counterclockwise and the engaging portion 412 is inserted into the engaging groove 4221, the conversion wheel 41 rotates to the first rotation position, and the blocking piece 411 covers the second through hole 2412, such that most of the fluid flows into the first through hole 2411 and pushes the impeller transmission member 24 to rotate. It should be noted that no matter which through hole is blocked by the blocking piece 411, water will flow into both through holes, but the unblocked hole will receive more water than the blocked hole. Because the engaging portion 412 is hook-shaped, it will not disengage from the engaging groove 4221 when the conversion wheel 41 rotates counterclockwise. When the hose 3 is rotated to a certain extent, the protruding rib 2522 on the hose connector 252 is engaged with the matching through hole 4211 of the angle adjuster 423 and drives the angle adjuster 423 to rotate, which in turn drives the angle control sleeve 424, the stroke switching lever 425 and the switching lever 422 to rotate. The switching lever 422 is rotated clockwise to disengage the engaging portion 412 from the engaging groove 4221. Then, the conversion wheel 41 rotates counterclockwise under the action of water flow, which enables the engaging portion 412 to lean against the engaging plane 4222. Since the switching lever 422 leans against the restriction protrusion 2413, the conversion wheel 41 is in the second rotation position. Most of the fluid flows into the second through hole 2412 and pushes the impeller transmission member 24 to rotate reversely, realizing the reverse rotation of the hose 3.

The invention claimed is:

1. A sand-proof sprinkler mechanism, wherein the sand-proof sprinkler mechanism comprises a base, a housing and a connecting platform, the housing and the connecting platform are disposed on the base, a hose is rotatably connected between the housing and the connecting platform, the housing has a water outlet, a housing inner chamber and a water inlet that are in communication with the hose, the housing includes an impeller transmission member and a transmission device that is drivingly connected to the impeller transmission member and the hose, the housing further includes an adjustment device for adjusting a direction of a water flow, so that the impeller transmission member is driven by the water flow to rotate clockwise and counterclockwise to drive the hose to rotate back and forth, the housing further has a partition to divide the housing inner chamber into a water chamber and a sealing chamber, the water chamber is connected to the water outlet, the transmission device is mounted in the sealing chamber, a water baffle is provided at an opening of the sealing chamber to cover the sealing chamber and house the transmission device within the sealing chamber, thereby blocking most of the water while permitting the remaining part of the water to enter the sealing chamber to lubricate the transmission device, and preventing hard particles from entering and jamming the transmission device, and the water baffle has a connecting through hole for the transmission device to be connected to an output end of the impeller transmission member.

2. The sand-proof sprinkler mechanism as claimed in claim 1, wherein the transmission device includes a gear element that is drivingly connected to the impeller transmission member and a hose connector that is drivingly connected to the gear element and detachably connected to the hose, and the water outlet is disposed on the hose connector.

3. The sand-proof sprinkler mechanism as claimed in claim 2, wherein the hose has a locking groove, and the hose connector has a locking buckle to be locked in the locking groove.

4. The sand-proof sprinkler mechanism as claimed in claim 2, wherein an impeller cover is provided on one side of the impeller transmission member close to the water inlet, the impeller cover has a first through hole and a second through hole, the adjustment device includes a conversion wheel rotatably connected to the impeller cover and an angle adjustment unit connected to the conversion wheel in a snap-fit manner, the conversion wheel includes a blocking piece thereon, the conversion wheel has a first rotation position and a second rotation position, when the conversion wheel rotates to the first rotation position, the blocking piece covers the second through hole, when the conversion wheel rotates to the second rotation position, the blocking piece covers the first through hole.

5. The sand-proof sprinkler mechanism as claimed in claim 4, wherein the angle adjustment unit includes an angle adjustment assembly that is rotatably connected outside the housing and a switching lever that is drivingly connected to the angle adjustment assembly, the conversion wheel has an engaging portion, the switching lever has an engaging groove for insertion of the engaging portion and an engaging plane for engagement of the engaging portion, the impeller cover has a restricting protrusion, when the conversion wheel rotates to the first rotation position, the engaging portion is inserted into the engaging groove, when the conversion wheel rotates to the second rotation position, the engaging portion leans against the engaging plane and the switching lever leans against the restricting protrusion;

the angle adjustment assembly has a matching through hole, the hose connector has a protruding rib inserted into the matching through hole, when the hose connector is rotated, the protruding rib leans against an inner wall of the matching through hole to rotate the angle adjustment assembly, thereby rotating the switching lever.

6. The sand-proof sprinkler mechanism as claimed in claim 5, wherein the angle adjustment assembly includes an angle adjuster, an angle control sleeve and a travel switching lever, the angle adjuster has a mounting through hole, a connecting block having a wavy surface is provided on an inner wall of the mounting through hole, the angle control sleeve includes an outer toothed ring that is inserted into the mounting through hole and meshed with the connecting block, the angle control sleeve includes a travel block, the travel block has a travel through hole, and the stroke switching lever includes a stroke rod inserted into the stroke through hole and a switching through hole into which one end of the switching lever is inserted.

7. The sand-proof sprinkler mechanism as claimed in claim 4, wherein the impeller cover has an impeller cam, the impeller cam has an impeller groove, the impeller transmission member is partially disposed in the impeller groove, and the first through hole and the second through hole are defined in the impeller groove.

8. The sand-proof sprinkler mechanism as claimed in claim 4, wherein the housing has a guide slope and a guide baffle at the water inlet so that the water flow drives the conversion wheel to rotate counterclockwise.

9. The sand-proof sprinkler mechanism as claimed in claim 4, wherein a pressure-reducing valve is provided on an upper portion of the impeller cover.

10. The sand-proof sprinkler mechanism as claimed in claim 1, wherein the hose has at least two spray nozzles and at least two bosses with different inclination directions, the bosses each have a hose hole communicating with an interior of the hose and configured for insertion of the nozzles, and a hole cleaner is insertedly connected to one end of the hose.

* * * * *